United States Patent [19]
Hara et al.

[11] Patent Number: 5,686,665
[45] Date of Patent: Nov. 11, 1997

[54] DYNAMIC AMOUNT DETECTOR, DYNAMIC AMOUNT DETECTING METHOD, AND CAMERA WITH DYNAMIC AMOUNT DETECTOR

[75] Inventors: Shinya Hara, Tokyo; Mitsuhiro Okazaki, Kawasaki, both of Japan

[73] Assignee: Nikon Corporation, Tokyo, Japan

[21] Appl. No.: 647,003

[22] Filed: May 9, 1996

[30] Foreign Application Priority Data

May 11, 1995 [JP] Japan .................................. 7-113338

[51] Int. Cl.[6] .................................................. G01P 15/00
[52] U.S. Cl. ................................................ 73/495; 73/488
[58] Field of Search ............................ 73/491, 488, 492, 73/495, 496, 504.03

[56] References Cited

U.S. PATENT DOCUMENTS

| | | | |
|---|---|---|---|
| 5,107,127 | 4/1992 | Stevens | 250/548 |
| 5,402,197 | 3/1995 | Okano et al. | 254/400 |
| 5,541,860 | 7/1996 | Takei et al. | 73/491 |

FOREIGN PATENT DOCUMENTS

| | | |
|---|---|---|
| 0 177 919 | 4/1986 | European Pat. Off. . |
| 0 504 930 | 9/1992 | European Pat. Off. . |
| 0 658 797 | 6/1995 | European Pat. Off. . |
| 3-276072 | 12/1991 | Japan . |
| 7-225405 | 8/1995 | Japan . |

*Primary Examiner*—Richard Chilcot
*Assistant Examiner*—Max H. Noori
*Attorney, Agent, or Firm*—Foley & Lardner

[57] ABSTRACT

A dynamic amount detector generates correction information according to a predetermined relational expression, based on directions and magnitudes of dynamic amounts which are opposite to each other and imparted to one of directions of a plurality of detection axes, directions and magnitudes of dynamic amounts imparted to respective directions of the remaining detection axes, and detection values in a dynamic amount detecting means obtained when these dynamic amounts are respectively imparted. By means of this correction information, the output value detected by the dynamic amount detecting means is corrected. While a high detection accuracy is attained, the correction information concerning detection accuracy can be determined simply.

13 Claims, 8 Drawing Sheets

|   | 1G TO X-AXIS [m/s²] | 1G TO Y-AXIS [m/s²] | 1G TO Z-AXIS [m/s²] |
|---|---|---|---|
| X | 10.35 | 2.22 | 1.85 |
| Y | 1.63 | 10.40 | 2.44 |
| Z | −1.59 | 1.40 | 10.33 |

Fig. 3B

|   | 1G TO X-AXIS [m/s²] | 1G TO Y-AXIS [m/s²] | 1G TO Z-AXIS [m/s²] |
|---|---|---|---|
| X | 9.8147 | −0.0041 | −0.0014 |
| Y | 0.0012 | 9.8192 | 0.0061 |
| Z | 0.0007 | 0.0039 | 9.8165 |

Fig. 4A

|   | INTERFERENCE COMPONENT FOR X-AXIS (%) | INTERFERENCE COMPONENT FOR Y-AXIS (%) | INTERFERENCE COMPONENT FOR Z-AXIS (%) |
|---|---|---|---|
| X | – | 21.3 | 17.9 |
| Y | 15.7 | – | 23.6 |
| Z | −15.4 | 13.5 | – |

Fig. 4B

|   | INTERFERENCE COMPONENT FOR X-AXIS (%) | INTERFERENCE COMPONENT FOR Y-AXIS (%) | INTERFERENCE COMPONENT FOR Z-AXIS (%) |
|---|---|---|---|
| X | – | −0.042 | −0.014 |
| Y | 0.012 | – | 0.062 |
| Z | 0.007 | 0.040 | – |

DYNAMIC AMOUNT DETECTOR, DYNAMIC AMOUNT DETECTING METHOD, AND CAMERA WITH DYNAMIC AMOUNT DETECTOR

BACKGROUND OF THE INVENTION

1. Field of the Invention

The present invention relates to a dynamic amount detector, a dynamic amount detecting method, and a camera equipped with the dynamic amount detector. In particular, it relates to the dynamic amount detector and dynamic amount detecting method by which dynamic amounts such as acceleration, angular velocity, angular acceleration, and force in cameras and the like can be determined simply and accurately as well as to a camera equipped with such a dynamic amount detector.

2. Related Background Art

In recent years, cameras which can correct photographers' manual blurring have been developed. Normally, one or a plurality of acceleration sensors (or angular velocity sensors) are installed within such a camera. When the number of the acceleration sensors is one, an acceleration sensor which can detect multi-axial acceleration is used for detecting accelerations and the like exerted on the camera in a plurality of axial directions.

Also, the multi-axial acceleration sensor has been known to have an interference component in each axis, for example, as disclosed in Japanese Patent Laid-Open No. 3-276072. According to this publication, in an acceleration detecting apparatus for detecting accelerations in two-dimensional or three-dimensional directions, a characteristic matrix indicating the state of interference occurring between the individual axial components and an inverse matrix which is in inverse relation thereto are determined beforehand. Then, this inverse matrix is used to perform a correction operation, thereby cancelling the influence of the multi-axial interference. This correction operation is performed by an analog arithmetic circuit.

Figure 8:
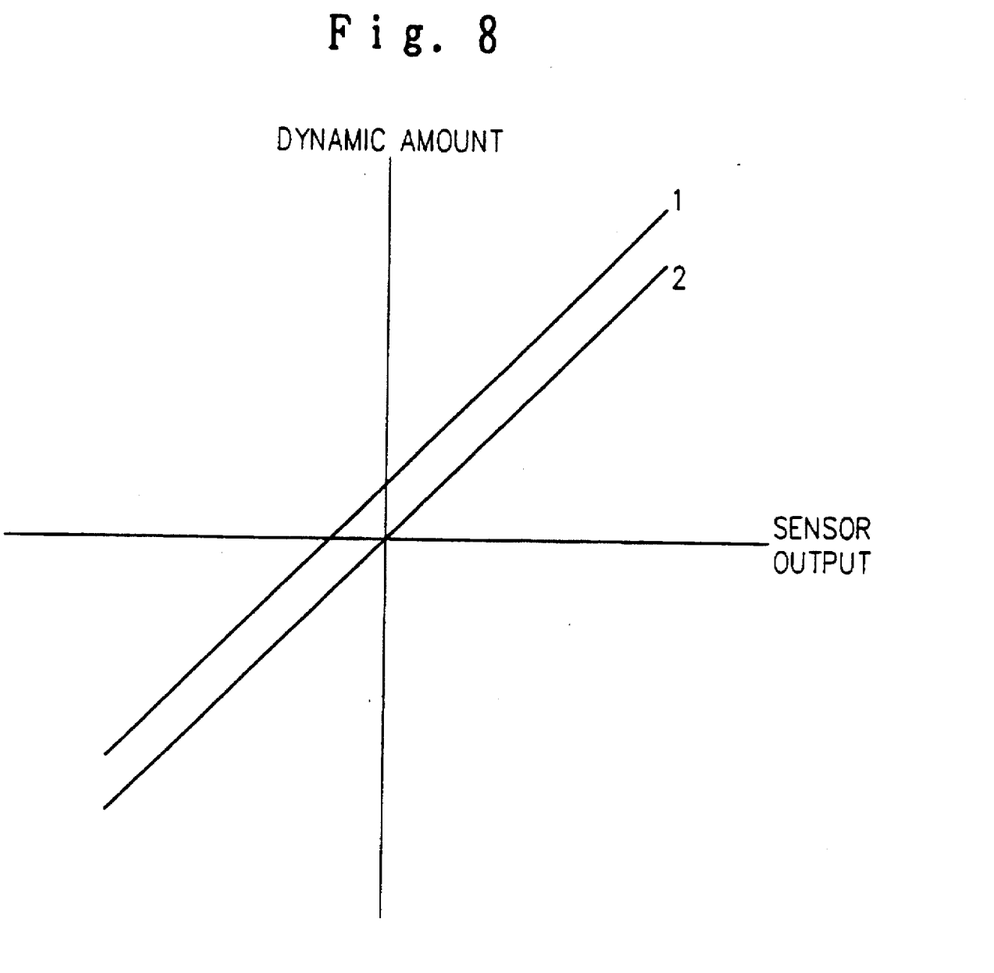
FIG. 8 is a diagram showing a relationship between the outputs of a sensor obtained before and after the sensor is attached to a camera and the dynamic amounts determined from these outputs.

In this conventional art, however, when the sensor for acceleration or the like is attached to a camera or the like, the dynamic amount detected before the sensor is attached to the camera or the like may differ from that detected thereafter. FIG. 8 shows a relationship between outputs of a sensor before and after its attachment to a camera, which are respectively indicated by lines 1 and 2.

in FIG. 8, the deviation of the lines 1 and 2 from each other is a detection error, which is mainly generated due to an installation error occurring when the sensor is attached to the camera. When there is an installation error, the correction operation determined before the sensor is attached to the camera becomes meaningless. Of course, in order to eliminate the installation error, the sensor may need to have a higher accuracy in its installation. However, it is disadvantageous in that the cost for installation will increase thereby.

When the sensor is attached to an object in which the installation error is not so important as in the case of precision mechanical equipment such as a camera, the correction value determined before the sensor is attached to the object may be used as it is. In this case, however, there is also a demand for determining a correction value in a simple manner.

SUMMARY OF THE INVENTION

In order to overcome the foregoing problems of the prior art, the first object of the present invention is to provide dynamic amount detector and dynamic amount detecting method with a high detection accuracy as well as a camera equipped with such a dynamic amount detector. The second object of the present invention is to provide dynamic amount detector and dynamic amount detecting method by which correction information concerning detection accuracy can be simply determined as well as a camera equipped with such a dynamic amount detector.

One aspect of the present invention is a dynamic amount detector comprising a dynamic amount detecting means having a plurality of detection axes for detecting one kind of dynamic amount selected from the group consisting of acceleration, angular velocity, angular acceleration, and force; a correction information generating means for generating correction information, according to a predetermined relational expression, based on directions and magnitudes of dynamic amounts which are opposite to each other and imparted to one of directions of the plurality of detection axes, directions and magnitudes of dynamic amounts imparted to respective directions of the remaining detection axes, and detection values in the dynamic amount detecting means obtained when the dynamic amounts are respectively imparted; a storage means for storing the correction information; and a correcting means for correcting an output value detected by the dynamic amount detecting means by using the correction information stored in the storage means.

Another aspect of the present invention is a camera comprising: a dynamic amount detector comprising a dynamic amount detecting means having a plurality of detection axes for detecting one kind of dynamic amount selected from the group consisting of acceleration, angular velocity, angular acceleration, and force; a correction information generating means for generating correction information, according to a predetermined relational expression, based on directions and magnitudes of dynamic amounts which are opposite to each other and imparted to one of directions of the plurality of detection axes, directions and magnitudes of dynamic amounts imparted to respective directions of the remaining detection axes, and detection values in the dynamic amount detecting means obtained when the dynamic amounts are respectively imparted; a storage means for storing the correction information; and a correcting means for correcting an output value detected by the dynamic amount detecting means by using the correction information stored in the storage means; a manual-blurring correcting means for correcting manual blurring based on a result of detection corrected by the dynamic amount detector; and a driving means for driving the manual-blurring correcting means.

A still another aspect of the present invention is a dynamic amount detecting method comprising the steps of: changing, at least four times, a position of an object to be detected, which is equipped with a dynamic amount detecting means which has a plurality of detection axes and detects one kind of dynamic amount selected from the group consisting of acceleration, angular velocity, angular acceleration, and force; independently imparting dynamic amounts, which are opposite to each other, to one of directions of the plurality of detection axes, while imparting dynamic amounts with arbitrary directions to respective directions of the remaining detection axes, so as to generate correction information, according to a predetermined relational expression, based on directions and magnitudes of the respective dynamic amounts and detection values in the dynamic amount detecting means obtained when the dynamic amounts are respectively imparted; storing thus generated correction information; and then using thus stored correction information to correct an output value detected by the dynamic amount detecting means.

In the present invention, the dynamic amount detecting means has a plurality of detection axes and detects the dynamic amount acting on each direction of the detection axes. The storage means stores correction information for correcting a detection value of the dynamic amount detecting means. The correcting means uses this correction information to correct the detection value. Here, the correction information is generated by the correction information generating means.

Also, the plurality of detection axes may be three axes (referred to as x-axis, y-axis,-and z-axis hereinafter) orthogonal to each other. In this case, for example, the correction information generating means generates the correction information on the basis of a relationship among the directions and magnitudes of dynamic amounts which are opposite to each other and imparted to one of directions of the plurality of detection axes (e.g., x-axis direction), directions and magnitudes of dynamic amounts imparted to respective directions of the remaining detection axes (e.g., y-axis direction and z-axis direction), and results of detection in the dynamic amount detecting means obtained when the dynamic amounts are respectively imparted. The direction of a dynamic amount, for example in the case of x-axis direction, corresponds to the positive or negative direction of x-axis and is specifically expressed by signs. The magnitude of a dynamic amount is the absolute value of the dynamic amount.

In this case, four dynamic amounts in total are provided, namely, two for x-axis direction and one for each of y-axis and z-axis directions, whereby four kinds of detection results are obtained. Also, since the dynamic amount detecting means detects the dynamic amount acting in each detection axis direction, each of the four kinds of detection results include all of the detection information concerning x-axis direction, the detection information concerning y-axis direction, and the detection information concerning z-axis direction.

Thus, when the four dynamic amounts mentioned above are provided, correction information can be generated.

Here, the dynamic amount detecting means detects the dynamic amount while being attached to an object.

In the case where acceleration is adopted as a dynamic amount, when the position of the object is successively changed, gravitational acceleration may be used as dynamic amounts with a plurality of directions having a known magnitude. The object may be the main body of a camera or a lens barrel thereof, whose position can be easily changed.

Also, when correction information is generated with the detecting means attached to the target object, its detection accuracy is improved as compared with the conventional case in which the correction information is determined before the attachment.

Further, when the position of the object equipped with the detecting means, which has a plurality of detection axes and detects the dynamic amount acting in each direction of the detection axes, is changed at least four times, the correction information can be generated.

The dynamic amount may not only be acceleration but also angular velocity, angular acceleration, or force.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the present invention will be explained with reference to the drawings.

Embodiment 1

FIGS. 1A to 1D respectively show four positions of a camera 11 equipped with a dynamic amount detector 12 of this embodiment, in which gravity acts in the direction of arrow A. As shown in FIG. 2, the dynamic amount detector 12 has a detecting section 21, a correction information generating section 22, and a correcting section 23. This embodiment uses, as the detecting section 21, a detection device (e.g., a semiconductor device utilizing piezoelectric resistance effect) which detects accelerations in respective directions of axial components of x-, y-, and z-axes (orthogonal to each other) and outputs their respective results as voltage values. Each of the correction information generating section 22 and the correcting section 23 is configured, for example, with a CPU and a storage section (only the storage section 24 is depicted). Each storage section stores a program or the like which becomes necessary when an operation, which will be explained later, is performed by the CPU. Also, the detecting section 21 is formed at a flexible section (not depicted) whose amount of flexure changes in response to the acceleration provided. In this embodiment, the flexible section is manufactured as a silicon substrate and is hollowed out into a concave form by an etching process. Here, when the correction information generating section 22 and the correcting section 23 are formed on a silicon substrate which already has the flexible section formed therein, the size of the dynamic amount detector can have a smaller size, while reducing its wiring resistance. As the acceleration sensor, one, which can measure accelerations in three axial directions, as well as three acceleration sensors, which can respectively measure accelerations in the three axial directions may be used.

Also, the camera comprises, in addition to the dynamic amount detector, a manual-blurring correcting means and a driving means for driving this manual-blurring correcting means. Such a camera is disclosed in U.S. patent application Ser. No. 355,475 (EP0658797A1) or the like. U.S. patent application Ser. No. 355,475 is incorporated herein by reference.

From the detection device, the results of detection are normally output as voltage values Vx, Vy, and Vz. Accordingly, with respect to these voltage values, coefficients Cx, Cy, and Cz and DC component Values VxDC', VyDC', and VzDC', which have been determined beforehand, are used to perform calculations indicated by equations (1), thereby computing dynamic amounts such as accelerations Ax', Ay', and Az'. The above-mentioned coefficients and DC component values are values intrinsic to the dynamic amount detector 12 determined before the sensor is attached to the camera.

$$Ax' = Cx \ (Vx - VxDC')$$
$$Ay' = Cy \ (Vy - VyDC')$$
$$Az' = Cz \ (Vz - VzDC') \tag{1}$$

Here, a multi-axial sensor normally has an interference component in each axis and, specifically, a relationship indicated by equation (2):

$$\begin{bmatrix} Vx - VxDC \\ Vy - VyDC \\ Vz - VzDC \end{bmatrix} = \begin{bmatrix} Sxx & Sxy & Sxz \\ Syx & Syy & Syz \\ Szx & Szy & Szz \end{bmatrix} \begin{bmatrix} Ax \\ Ay \\ Az \end{bmatrix} \tag{2}$$

wherein Ax, Ay, Az are dynamic amounts provided; Vx, Vy, and Vz are output values of the detection device; and Sxx, Sxy, Sxz, Syx, Syy, Syz, Szx, Szy, and Szz indicate detection sensitivity coefficients.

Here, equation (2) can be modified into:

$$\begin{bmatrix} Ax \\ Ay \\ Az \end{bmatrix} = \begin{bmatrix} Sxx & Sxy & Sxz \\ Syx & Syy & Syz \\ Szx & Szy & Szz \end{bmatrix}^{-1} \begin{bmatrix} Vx - VxDC \\ Vy - VyDC \\ Vz - VzDC \end{bmatrix} \tag{3}$$

Further, it can be expressed as:

$$\begin{bmatrix} Ax \\ Ay \\ Az \end{bmatrix} = \begin{bmatrix} C11 & C12 & C13 \\ C21 & C22 & C23 \\ C31 & C32 & C33 \end{bmatrix} \begin{bmatrix} Vx - VxDC \\ Vy - VyDC \\ Vz - VzDC \end{bmatrix} \tag{4}$$

wherein coefficients C11 to C33 constitute an inverse matrix of the detection sensitivity coefficients Sxx to Szz.

Equation (4) can be expressed as general equations as follows:

$$Ax = C11 \ (Vx - VxDC) + C12 \ (Vy - VyDC) + C13 \ (Vz - VzDC)$$

$$Ay = C21 \ (Vx - VxDC) + C22 \ (Vy - VyDC) + C23 \ (Vz - VzDC)$$

$$Az = C31 \ (Vx - VxDC) + C32 \ (Vy - VyDC) + C33 \ (Vz - VzDC)$$

Namely, when the five equations (5) are used, dynamic amounts Ax, Ay, and Az in which the interference components of the respective axes have been corrected can be determined.

Figure 1A:
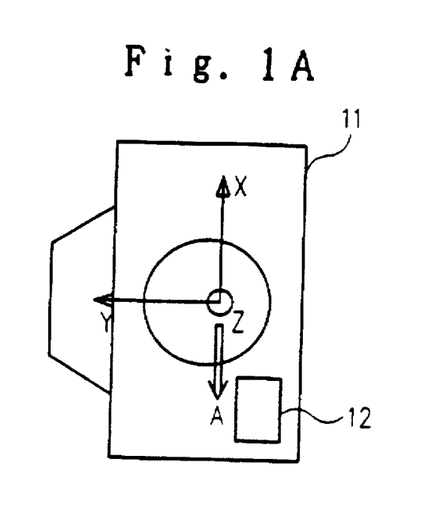
FIGS. 1A to 1D are schematic views showing four positions of a camera equipped with a dynamic amount detector in accordance with Embodiment 1 of the present invention.
Figure 2:
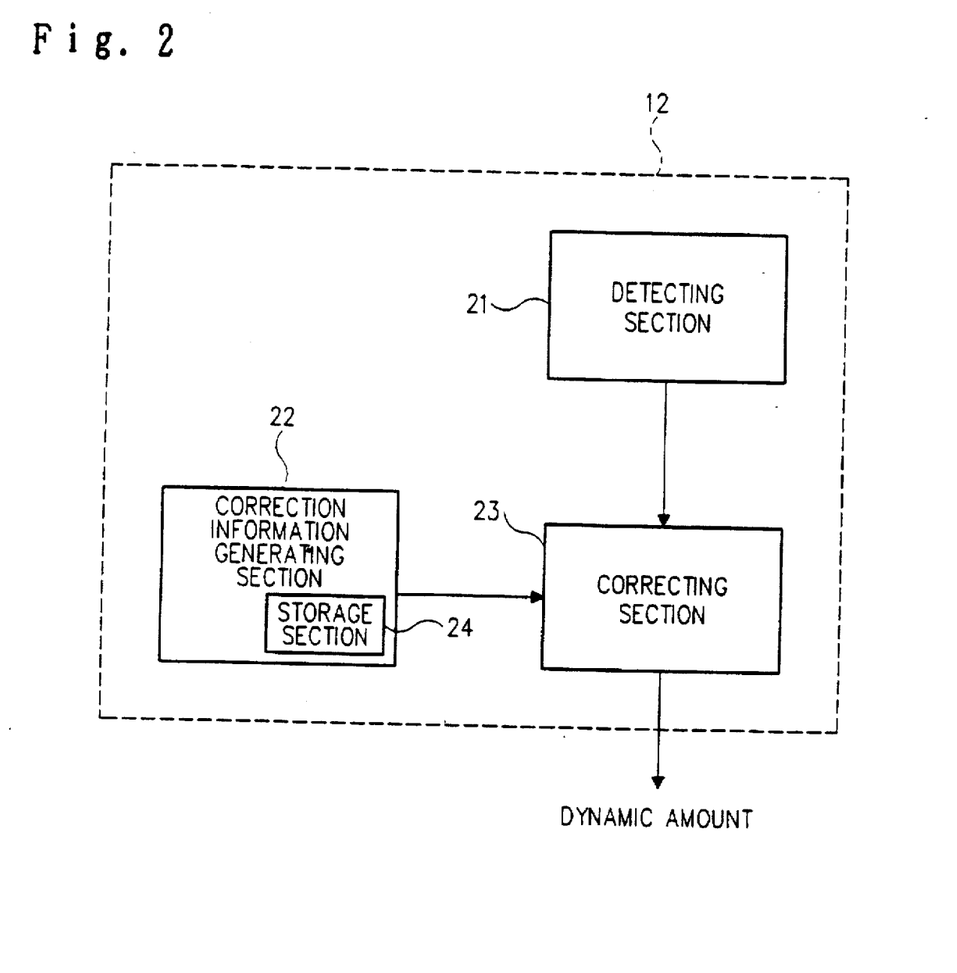
FIG. 2 is a block diagram showing the dynamic amount detector in accordance with Embodiment 1 of the present invention.

FIG. 1A shows a state in which the positive direction of x-axis is positioned upward in the drawing. Here, the detection device theoretically detects accelerations in the respective axial directions as follows:

$$Ax = G, \ Ay = 0, \ Az = 0 \tag{6}$$

wherein Ax is an acceleration in x-axis direction, Ay is an acceleration in y-axis direction, Az is an acceleration in z-axis direction, and G is gravitational acceleration.

When a detection device is attached to a camera, however, since an installation error occurs in general, one axial component may include another axial component. Accordingly, the output voltages of the detection device may the include detection errors. Here, its output voltages are assumed to be Vxxu, Vyxu, and Vzxu, which respectively correspond to x-axis output, y-axis output, and z-axis output.

Figure 1B:
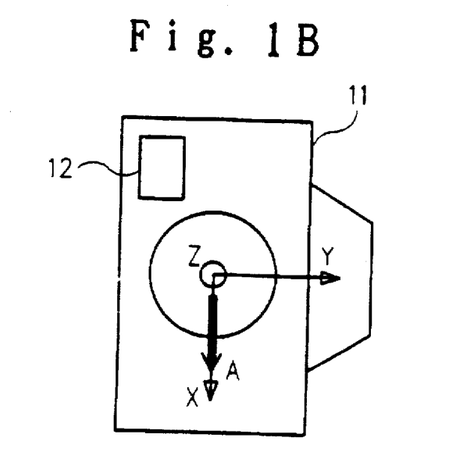

FIG. 1B shows a state in which the positive direction of x-axis is positioned downward in the drawing. Here, the detection device theoretically detects accelerations in the respective axial directions as follows:

$$Ax = -G, \ AF = 0, \ Az = 0 \tag{7}$$

Here, its output voltages are assumed to be Vxxd, Vyxd, and Vzxd. These output voltages may include detection errors as mentioned above.

Figure 1C:
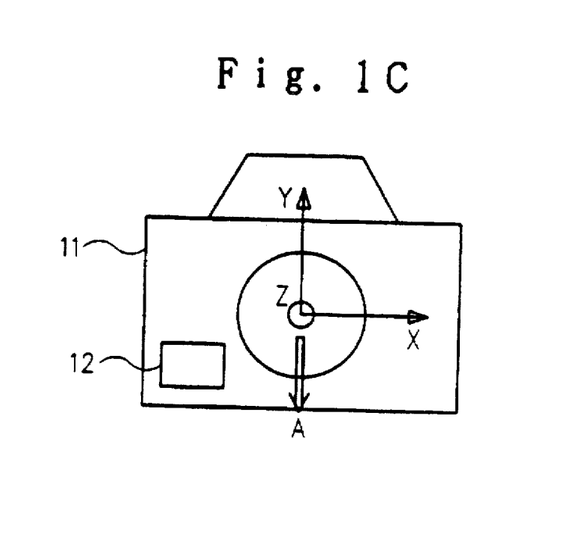

FIG. 1C shows a state in which the positive direction of y-axis is positioned upward in the drawing. Here, the detection device theoretically detects accelerations in the respective axial directions as follows:

$$AX = 0, \ Ay = G, \ Az = 0 \tag{8}$$

Here, its output voltages are assumed to be Vxyu, Vyyu, and Vzyu.

Figure 1D:
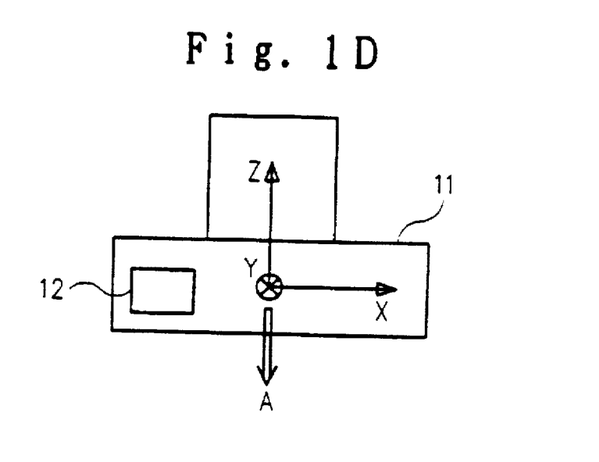

FIG. 1D shows a state in which the positive direction of z-axis is positioned upward in the drawing. Here, the detection device theoretically detects accelerations in the respective axial directions as follows:

$$Ax = 0, \ Ay = 0, \ Az = G \tag{9}$$

Here, its output voltages are assumed to be Vxzu, Vyzu, and Vzzu.

Then, the correction information generating section 22 solves twelve simultaneous equations consisting of: three equations obtained when Ax=G, Ay=0, Az=0, Vx=Vxxu, Vy=Vyxu, and Vz=Vzxu are input into equation (2); three equations obtained when Ax=-G, Ay=0, Az=0, Vx=Vxxd, Vy=Vyxd, and Vz=Vzxd are input into equation (2); three equations obtained when Ax=0, Ay=G, Az=0, Vx=Vxyu, Vy=Vyyu, and Vz=Vzyu are input into equation (2); and three equations obtained when Ax=0, Ay=0, Az=G, Vx=Vxzu, Vy=Vyzu, and Vz=Vzzu are input into equation (2); thereby computing the detection sensitivity coefficients Sxx, Sxy, Sxz, Syx, Syy, Syz, Szx, Szy, and Szz and VxDC (DC component of x-axis), VyDC (DC component of X-axis), and VzDC (DC component of z-axis). These values are indicated by equations (10) and (11) and are stored in the storage section 24 of the correction information generating section 22. Here, this operation is performed before the actual acceleration is detected.

In order to actually detect the acceleration, the correcting section 23 receives the voltage values Vx, Vy, and Vz output from the detection device and then converts them respectively into Ax, Ay, and Az by means of equation (3) [or equation (4)] in which the detection sensitivity coefficients and DC component values determined by the correction information generating section 22 are set. At this moment, each voltage value is converted into an acceleration, while the interference component in each axis is corrected.

$$VxDC = (Vxxu + Vxxd)/2 \quad (10)$$
$$VyDC = (Vyxu + Vyxd)/2$$
$$VzDC = (Vzxu + Vzxd)/2$$

$$Sxx = (Vxxu - VxDC)/G \quad (11)$$
$$Sxy = (Vyxu - VyDC)/G$$
$$Sxz = (Vzxu - VzDC)/G$$
$$Syx = (Vxyu - VxDC)/G$$
$$Syy = (Vyyu - VyDC)/G$$
$$Syz = (Vzyu - VzDC)/G$$
$$Szx = (Vxzu - VxDC)/G$$
$$Szy = (Vyzu - VyDC)/G$$
$$Szz = (Vzzu - VzDC)/G$$

As shown in FIGS. 3A and 3B and FIGS. 4A and 4B, accuracy in detection of accelerations obtained by this conversion processing is improved as compared with that obtained without the processing.

Figure 3A:
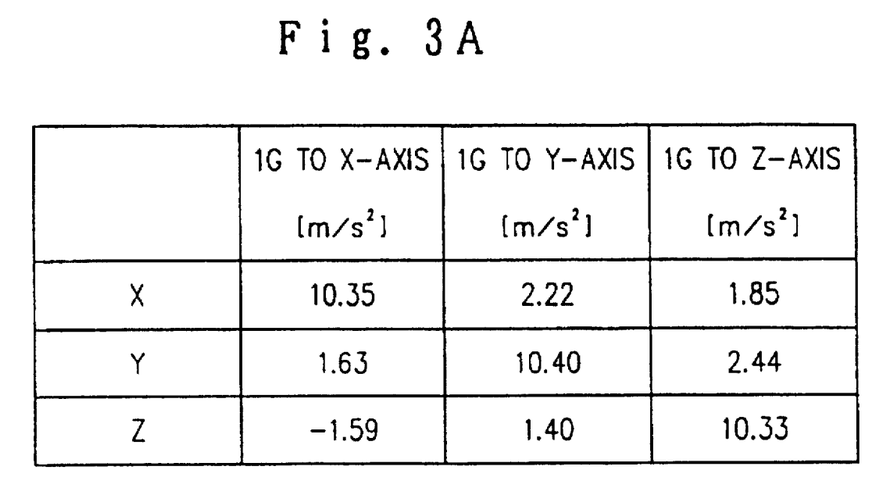
FIG. 3A is a chart showing outputs in individual axes when no correction is made by a dynamic amount detector.

Specifically, FIG. 3A shows data obtained when the above-mentioned conversion processing is not performed [i.e., data obtained when the sensor outputs are converted into accelerations by equation (1)]. For example, its first column shows the results of detection in the respective axes when an acceleration of 1 G is provided in the x-axis direction. Similarly, the second column shows the results of detection in the respective axes when an acceleration of 1 G is provided in the y-axis direction, whereas the third column shows the results of detection in-.the respective axes when an acceleration of 1 G is provided in the z-axis direction.

Figure 3B:
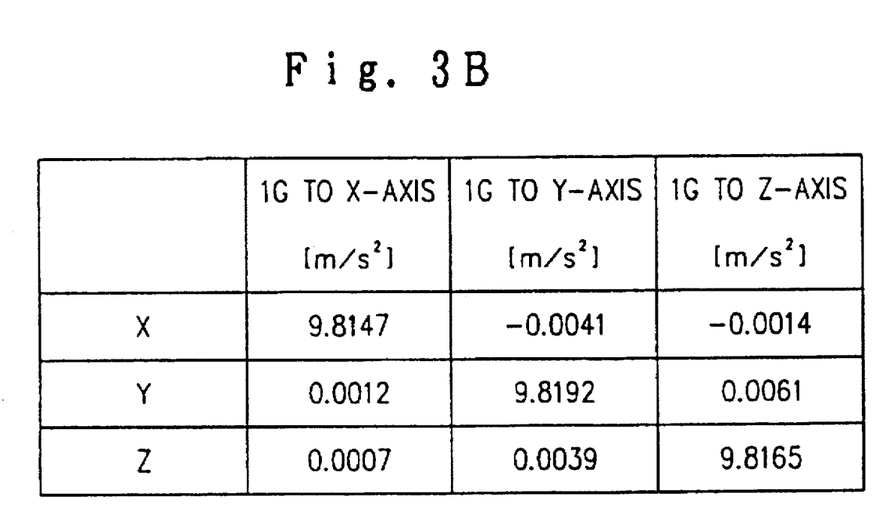
FIG. 3B is a chart showing outputs in individual axes when correction is made by the dynamic amount detector in accordance with Embodiment 1 of the present invention.

On the other hand, FIG. 3B shows data obtained when the above-mentioned conversion processing is performed. As mentioned above, its first column shows the results of detection in the respective axes when an acceleration of 1 G is provided in the x-axis direction. Also, the second and third columns show the results of detection in the respective axes when an acceleration of 1 G is provided in the y-axis direction and the z-axis direction, respectively.

Figure 4A:
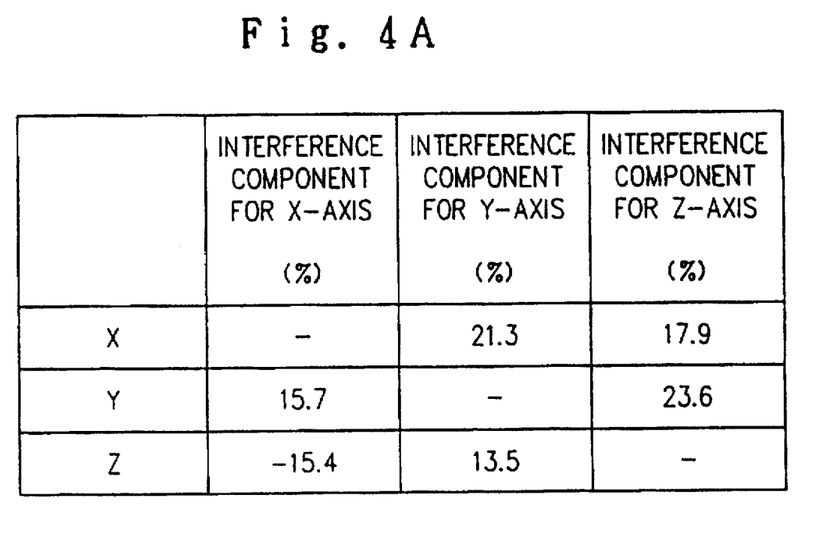
FIG. 4A is a chart showing interference components in individual axes when no correction is made by a dynamic amount detector.
Figure 4B:
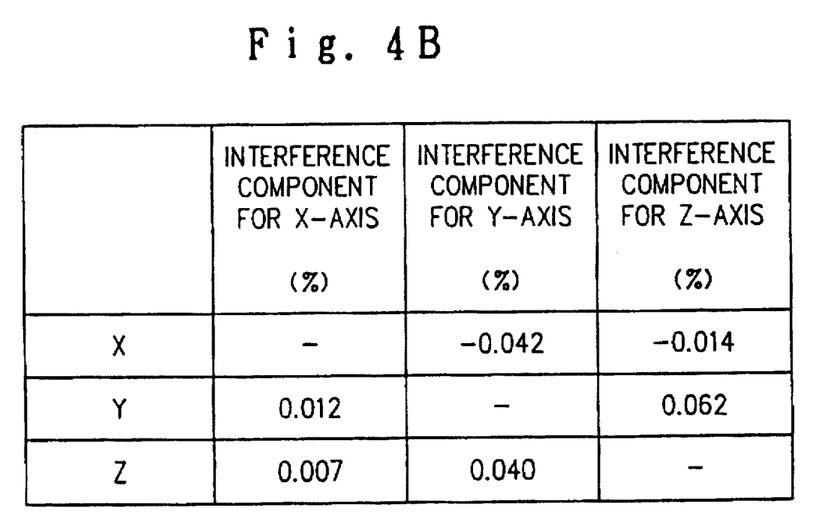
FIG. 4B is a chart showing interference components in individual axes when correction is made by the dynamic amount detector in accordance with Embodiment 1 of the present invention.

As can be seen from FIGS. 3A and 3B, accuracy in detection of data subjected to the conversion processing is improved as compared with that obtained without the processing. The difference therebetween is more remarkably represented in FIGS. 4A and 4B. FIGS. 4A and 4B show percentages of the interference components of the other axes with respect to the axis to which the acceleration is imparted. For example, in the first column in FIG. 3B, the interference components of the y-axis and the z-axis with respect to the result of detection of the x-axis are respectively (0.0012/ 9.8147) and (0.0007/9.8147), which are listed in the first column of FIG. 4B.

In this experiment, as can be seen from FIGS. 4A and 4B, the percentage of interference components, so-called crosstalk, is reduced by about three digits as a whole.

As explained in the foregoing, in accordance with this embodiment, when the position of the camera is changed only four times as shown in FIGS. 1A to 1D, the detection sensitivity coefficients and DC component values can be determined simply. Also, since the operation is performed after the dynamic amount detector is attached to the camera, the dynamic amount operation can be performed correctly regardless of the installation error. Namely, as compared with the conventional case where the dynamic amount detector has to be accurately attached to the camera, the installation process becomes simpler while the working time therefor is remarkably reduced. Here, in order to improve the accuracy in detection, the position of the camera may be changed five or six times.

Here, changes in the camera position should not be restricted to those of FIGS. 1A to 1D. The detection sensitivity coefficients and DC component values can be determined when accelerations opposite to each other are independently provided along one of x-axis, y-axis, and z-axis directions while accelerations in arbitrary directions are provided in the respective directions of the remaining detection axes. When accelerations are provided without using the three axes of FIGS. 1A to 1D as a reference, the magnitudes and directions of the accelerations in three axial directions obtained when the respective accelerations are provided have to be determined beforehand.

The change of position may be effected by means of a dedicated device at the time of adjustment before the shipment of the camera or by a user of the camera. In the latter case, for example, four planes (both side surfaces, lower surface, and rear surface in the case of FIGS. 1A to 1D) orthogonal to each other are formed at a part of the camera body beforehand. As the user successively positions these planes on a flat table or the like, the change in position such as that shown in FIGS. 1A to 1D can be realized.

Without being restricted to gravitational acceleration, the acceleration may be that imparted by means of an apparatus which forcibly provides acceleration, for example. Also, when an angular velocity sensor is used, an apparatus equipped with a rotary table on which the camera is to be mounted may be used.

Also, the object to which the dynamic amount detector 12 is attached may be the lens barrel of the camera. Of course, the dynamic amount detector 12 may be applied to various objects other than the camera. The dynamic amount to be detected may be selected among acceleration, angular velocity, angular acceleration, force, or the like according to the object.

Alternatively, the correction information generating section 22 may be disposed independently, without being attached to the camera, so as to read out herein the respective outputs of the detection device obtained when the four positions are changed, such that the detection sensitivity coefficients and DC component values are calculated as mentioned above and then the results thereof are stored in a storage section within the camera.

Also, the configuration may be such that the above-mentioned detection sensitivity coefficients and DC component values can be computed whenever an instruction from the user is received. The effects of correction according to the detection sensitivity coefficients and DC component values may decrease due to changes in the detection device and the like with age. Accordingly, when these values can be calculated at any time, the detection result with favorable accuracy can always be obtained.

In the case of an object in which the installation error or the like is not important (i.e., in which a low accuracy in detection is tolerable), the detection sensitivity coefficients and DC component values may be determined before the dynamic amount detector is attached to the object. Even in this case, when the dynamic amount detector is subjected to position changing as mentioned above, the detection sensitivity coefficients and DC component values can be determined simply.

Embodiment 2

In the following, the case where angular velocity is to be corrected will be explained on the basis of a gyrosensor.

Figure 5:
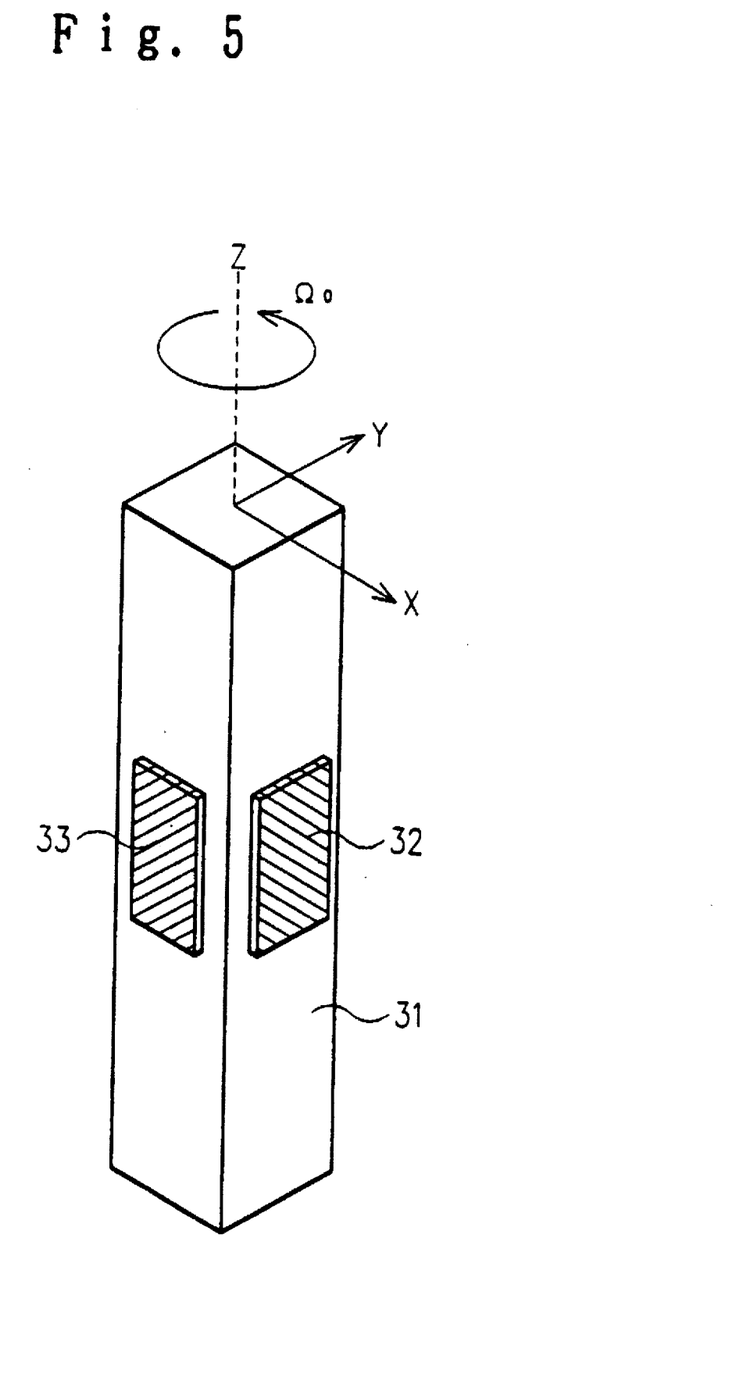
FIG. 5 is a schematic perspective view showing a piezoelectric vibrational gyro in accordance with Embodiment 2 of the present invention.
Figure 6A:
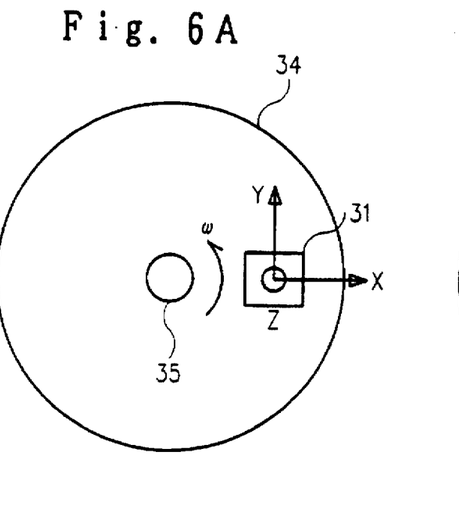
FIGS. 6A to 6D are schematic views showing respective states where the piezoelectric vibrational gyro in FIG. 5 is mounted with four kinds of positions on a table.
Figure 6B:
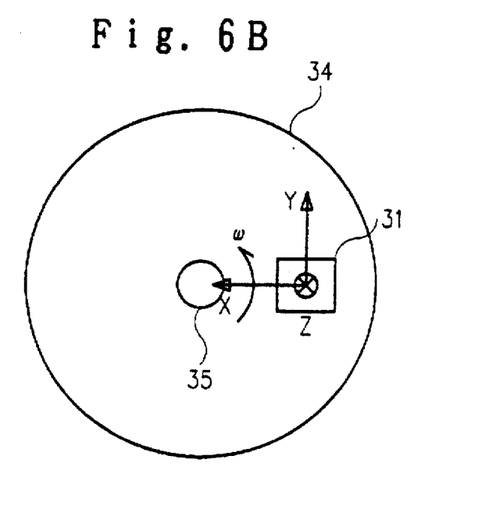
Figure 6C:
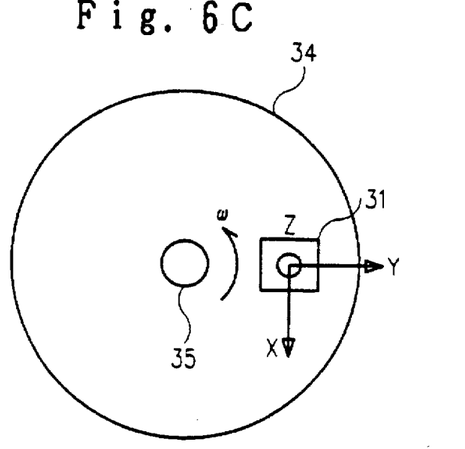
Figure 6D:
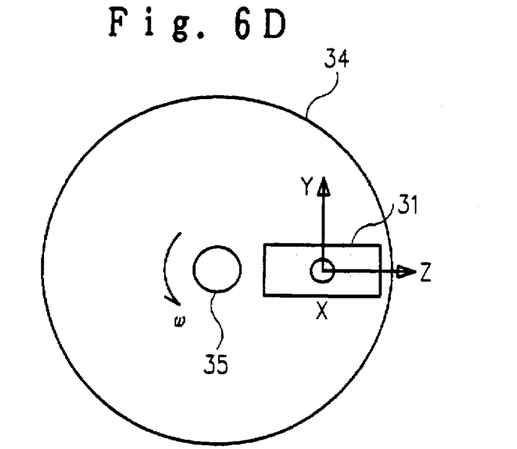

FIG. 5 is a schematic perspective view showing a tuning bar type piezoelectric vibrational gyro used for a car navigation system, for example. The piezoelectric vibrational gyro utilizes a dynamic phenomenon that, when a rotational angular velocity is applied to a vibrating object, a Coriolis force is generated in a direction perpendicular to this vibration. As shown in FIG. 5, in the piezoelectric vibrational gyro, a driving piezoelectric electromagnetic device 32 and a detecting piezoelectric electromagnetic device 33 are respectively bonded to side surfaces of a tubing bar vibrator 31. When a rotational angular velocity $\Omega_0$ is applied to the vibrator 31 in its center axis (z-axis), a Coriolis force is generated in a direction (y-axis) perpendicular to its vibration (x-axis), whereby the detecting piezoelectric electromagnetic device 33 bonded thereto in the y-axis can detect the rotational angular velocity.

FIGS. 6A to 6D show states of the vibrator 31 having three detection axes orthogonal to each other, as shown in FIG. 5, disposed on a turntable 34 with four positions, respectively. The turntable 34 is rotated around a rotational axis 35 with a known angular velocity $\omega$ and provides the angular velocity $\omega$ to each axis and one of the axes. At this time, based on the outputs of the driving piezoelectric electromagnetic device 32 and detecting piezoelectric electromagnetic device 33 at each position, the angular velocity in which the interference component for each axis has been corrected can be determined as in the case of Embodiment 1.

As explained above, the correction information for correcting the detection value of the dynamic amount detecting means can easily be determined. Also, since the correction information is determined after the dynamic amount detecting means is attached to the object to be detected, an improved detection accuracy is obtained.

Embodiment 3

Figure 7A:
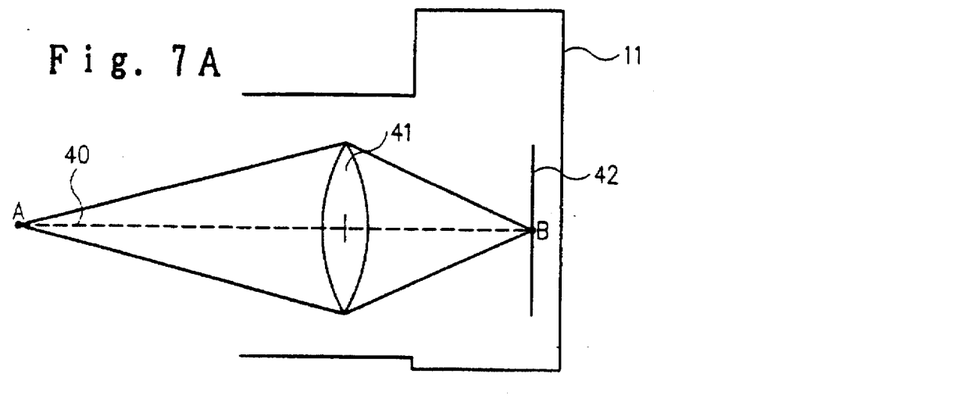
FIGS. 7A to 7C are views showing the principle of correcting manual blurring with a camera equipped with a dynamic amount detector in accordance with Embodiment 3 of the present invention.
Figure 7B:
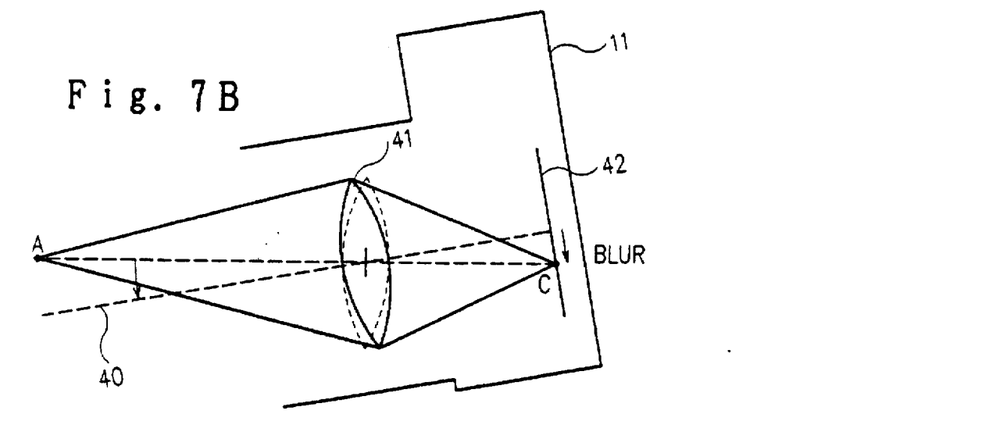
Figure 7C:
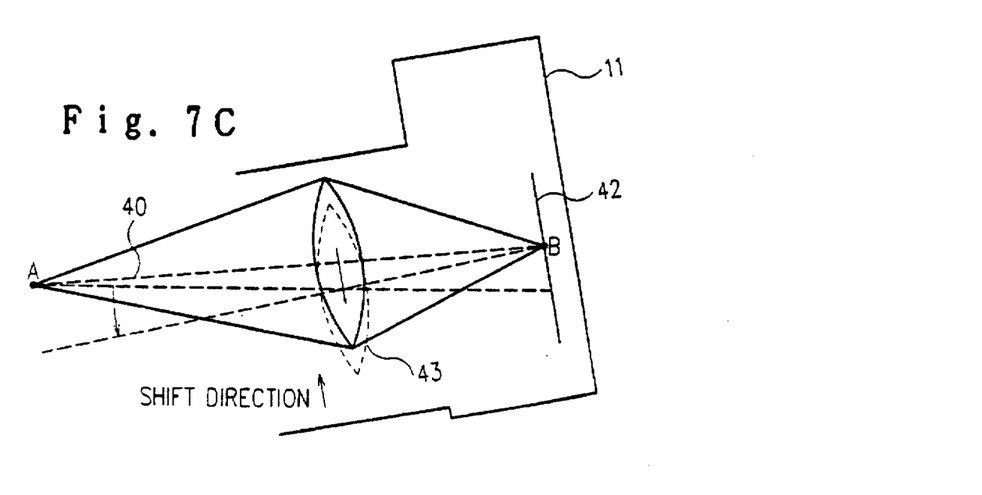

FIGS. 7A to 7C are views showing the principle of the case where manual blurring correction is effected by a camera equipped with a dynamic amount detector in accordance with Embodiment 3 of the present invention.

In these drawings, the dynamic amount detector (not depicted) is attached to the main body, lens barrel, or the like of the camera 11. When the camera 11 has no manual blurring, as shown in FIG. 7A, a point A on its optical axis 40 forms an image at a center point B of a film surface 42 by way of an optical system such as a lens 41. When the camera 11 is tilted from this state as shown in FIG. 7B, the point A forms an image at a point C which is shifted from the center of the film surface 42 in the direction of the arrow. Manual blurring, therefore, occurs. In order to detect this manual blurring by the dynamic amount detector so as to determine the amount of manual blurring, data which have been subjected to conversion processing as explained in Embodiment 1 are used. Accordingly, the amount of manual blurring can be measured with a high accuracy. The correction of manual blurring is effected such that, when the camera 11 is tilted, a correction optical system 43, which is a manual-blurring correcting means, is shifted in the direction of arrow by the thus determined amount of manual blurring so as to maintain the point C at the position of the center point B of the film surface 42. Here, the correction optical system 43 is driven and controlled by a driving means such as a DC motor (not depicted).

Also, the manual-blurring correction can be effected with respect to one or both of yawing, which is horizontal blurring of the camera, and pitching, which is vertical blurring of the camera.

Further, the dynamic amount detector in accordance with the present invention can be widely applied to various apparatuses such as video and image pickup devices in addition to cameras.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 113338/1995 (7-113338) filed on May 11, 1995 is hereby incorporated by reference.

What is claimed is:

1. A dynamic amount detector comprising:
  a dynamic amount detecting means having a plurality of detection axes for detecting one kind of dynamic amount selected from the group consisting of acceleration, angular velocity, angular acceleration, and force;
  a correction information generating means for generating correction information, according to a predetermined relational expression, based on directions, which are opposite to each other, and magnitudes of dynamic amounts which are imparted in one of the directions of said plurality of detection axes, and directions and magnitudes of dynamic amounts which are imparted to respective directions of the remaining detection axes, and detection values in said dynamic amount detecting means obtained when said dynamic amounts are respectively imparted;
  a storage means for storing said correction information; and
  a correcting means for correcting an output detected dynamic value detected and output by said dynamic amount detecting means by using the correction information stored in said storage means, when said dynamic amount detector detects dynamic values.

2. A dynamic amount detector according to claim 1, wherein said plurality of detection axes are two or three axes which are orthogonal to each other.

3. A dynamic amount detector according to claim 1, wherein said dynamic amount detector is attached to an object to be detected.

4. A dynamic amount detector according to claim 3, wherein said object to be detected is a main body or lens barrel of a camera.

5. A camera comprising:
  a dynamic amount detector comprising a dynamic amount detecting means having a plurality of detection axes for detecting one kind of dynamic amount selected from the group consisting of acceleration, angular velocity, angular acceleration, and force; a correction information generating means for generating correction information, according to a predetermined relational expression, based on directions, which are opposite to each other, and magnitudes of dynamic amounts which are imparted in one of the directions of said plurality of detection axes, and directions and magnitudes of dynamic amounts which are imparted to respective directions of the remaining detection axes, and detection values in said dynamic amount detector obtained when said dynamic amounts are respectively imparted; a storage means for storing said correction information; and a correcting means for correcting an output value detected and output by said dynamic amount detecting means by using the correction information stored in said storage means, when said dynamic amount detector detects dynamic amounts;

a manual-blurring correcting means for correcting manual blurring based on a result of detection corrected by said dynamic amount detector; and a driving means for driving said manual-blurring correcting means.

6. A camera according to claim 5, wherein said plurality of detection axes are two or three axes which are orthogonal to each other.

7. A dynamic amount detecting method comprising the steps of:

changing, at least four times, a position of an object to be detected, which is equipped with a dynamic amount detecting means which has three substantially orthogonal detection axes and detects one kind of dynamic amount selected from the group consisting of acceleration, angular velocity, angular acceleration, and force;

independently imparting dynamic amounts, which are opposed in direction in each one of said three detection axes, while imparting dynamic amounts with arbitrary directions to respective directions of the remaining detection axes, so as to generate correction information, according to a predetermined relational expression, based on directions and magnitudes of the respective imparted dynamic amounts and detection values in said dynamic amount detecting means obtained when said dynamic amounts are respectively imparted;

storing thus generated correction information; and then using thus stored correction information to correct an output value detected by said dynamic amount detecting means, when detecting dynamic amounts.

8. A dynamic amount detector comprising:

a dynamic amount detecting means having a plurality of detection axes for detecting one kind of dynamic amount selected from the group consisting of acceleration, angular velocity, angular acceleration, and force;

a correction information generating means for generating correction information, wherein said correction information generation comprises detecting sensitivity coefficients and DC component values, according to a predetermined relational expression, based on directions, which are opposed to each other, and magnitudes of dynamic amounts imparted in one of directions of said plurality of detection axes, and directions and magnitudes of dynamic amounts imparted in respective directions of the remaining detection axes, and detection values in said dynamic amount detecting means obtained when said dynamic amounts are respectively imparted;

a storage means for storing said correction information; and a correcting means for correcting an output of said dynamic amount detecting means by using the correction information stored in said storage means, when detecting said detector detects dynamic amounts, and outputting therefrom a corrected dynamic amount.

9. A camera comprising:

a dynamic amount detector comprising a dynamic amount detecting means having a plurality of detection axes for detecting one kind of dynamic amount selected from the group consisting of acceleration, angular velocity, angular acceleration, and force; a correction information generating means, for generating correction information, wherein said correction information generation comprises detecting sensitivity coefficients and DC component values, according to a predetermined relational expression, based on directions, which are opposed to each other, and magnitudes of dynamic amounts imparted in one of directions of said plurality of detection axes, and directions and magnitudes of dynamic amounts imparted in respective directions of the remaining detection axes, and detection values in said dynamic amount detector obtained when said dynamic amounts are respectively imparted; a storage means for storing said correction information; and a correcting means for correcting an output of said dynamic amount detector by using the correction information stored in said storage means, when said detector detects dynamic amounts;

a manual-blurring correction means for correcting manual blurring based on a result of detection corrected by said dynamic amount detector; and a driving means for driving said manual-blurring correcting means.

10. A dynamic amount detecting method comprising the steps of:

changing, at least four times, a position of an object to be detected, which is equipped with a dynamic amount detecting means which has three detection axes and detects one kind of dynamic amount selected from the group consisting of acceleration, angular velocity, angular acceleration, and force, before detecting output values by said dynamic amount detecting means;

independently imparting dynamic amounts, which are opposite in direction to each other, along each of said three detection axes, while imparting dynamic amounts arbitrarily along respective directions of the remaining detection axes, so as to generate correction information, said correction information comprising detecting sensitivity coefficients and DC component values, according to a predetermined relational expression, based on directions and magnitudes of the respective dynamic amounts and detection values in said dynamic amount detecting means obtained when said dynamic amounts are respectively imparted;

storing thus generated correction information; and then using thus stored correction information to correct a value of dynamic amounts detected and output by said dynamic amount detecting means, when detecting said dynamic amounts.

11. A dynamic amount detector according to claim 8, wherein said plurality of detection axes are two or three axes which are orthogonal to each other.

12. A dynamic amount detector according to 8, wherein said dynamic amount detecting means is attached to an object to be detected.

13. A dynamic amount detector according to claim 12, wherein said object to be detected is a main body or lens barrel of a camera.

* * * * *